US011719548B2

(12) United States Patent
Tang et al.

(10) Patent No.: US 11,719,548 B2
(45) Date of Patent: Aug. 8, 2023

(54) SYSTEM AND METHOD FOR ALTERNATIVE DESTINATION RECOMMENDATION ON RIDESHARING PLATFORMS

(71) Applicant: Beijing DiDi Infinity Technology and Development Co., Ltd., Beijing (CN)

(72) Inventors: Liang Tang, Santa Clara, CA (US); Bo Tan, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 299 days.

(21) Appl. No.: 17/035,104

(22) Filed: Sep. 28, 2020

(65) Prior Publication Data
US 2021/0199449 A1 Jul. 1, 2021

Related U.S. Application Data

(60) Provisional application No. 62/956,081, filed on Dec. 31, 2019.

(51) Int. Cl.
*G01C 21/34* (2006.01)
*G06Q 50/30* (2012.01)
(Continued)

(52) U.S. Cl.
CPC ..... *G01C 21/3476* (2013.01); *G01C 21/3484* (2013.01); *G06Q 10/02* (2013.01);
(Continued)

(58) Field of Classification Search
None
See application file for complete search history.

(56) References Cited

U.S. PATENT DOCUMENTS 9,200,918 B2 * 12/2015 Chelotti ............... G01C 21/362
10,248,913 B1    4/2019 Gururajan et al.
(Continued)

FOREIGN PATENT DOCUMENTS

CN    106407277 A    2/2017
CN    107436950 A    12/2017
(Continued)

OTHER PUBLICATIONS

PCT International Search Report and the Written Opinion dated Mar. 31, 2021, issued in related International Application No. PCT/CN2020/141946 (9 pages).
(Continued)

*Primary Examiner* — Anne Marie Antonucci
*Assistant Examiner* — Amelia Vorce
(74) *Attorney, Agent, or Firm* — Sheppard Mullin Richter & Hampton LLP

(57) ABSTRACT

Methods, systems, and apparatus for recommending alternative destinations in ride-sharing services are provided. A computing device implementing the method may start with receiving a trip request from a user device. The trip request may include an origin and a destination. Then the computing device classifies the trip request into one of a plurality of trip purpose categories based at least on the origin and the destination of the trip request, the rider's information, and a machine-learning classifier trained to predict the one trip purpose category of the trip request. In response to the one trip purpose category belonging to a preset group of trip purpose categories, the computing device determines one or more alternative destinations for the trip request, and sends to the user device, the one or more alternative destinations.

19 Claims, 8 Drawing Sheets

(51) Int. Cl.
  *G06Q 10/02* (2012.01)
  *G06Q 30/0202* (2023.01)
  *G06Q 30/0282* (2023.01)
  *G06Q 30/0283* (2023.01)
  *H04W 4/021* (2018.01)

(52) U.S. Cl.
  CPC ..... *G06Q 30/0202* (2013.01); *G06Q 30/0282* (2013.01); *G06Q 30/0284* (2013.01); *G06Q 50/30* (2013.01); *H04W 4/021* (2013.01)

(56) References Cited

U.S. PATENT DOCUMENTS

| | | | |
|---|---|---|---|
| 2017/0293925 A1 | 10/2017 | Marueli et al. | |
| 2018/0017400 A1* | 1/2018 | Andrew | G01C 21/3679 |
| 2018/0188058 A1* | 7/2018 | Dabholkar | G01C 21/3617 |
| 2018/0315088 A1* | 11/2018 | Bijor | G06Q 30/0261 |
| 2019/0188608 A1* | 6/2019 | Guru | G06Q 10/02 |
| 2019/0318031 A1* | 10/2019 | Sim | G06Q 40/12 |
| 2020/0004842 A1* | 1/2020 | Fateem | G06F 16/29 |
| 2020/0103245 A1* | 4/2020 | Bourque | G06F 16/954 |
| 2020/0104962 A1* | 4/2020 | Aich | G06Q 50/30 |
| 2020/0175632 A1 | 6/2020 | Vora et al. | |
| 2020/0380027 A1 | 12/2020 | Aggarwal et al. | |
| 2020/0401629 A1 | 12/2020 | Lin et al. | |
| 2021/0081994 A1* | 3/2021 | Newell | G06Q 30/0265 |
| 2021/0102816 A1* | 4/2021 | Neylan, III | G06Q 10/02 |
| 2021/0172751 A1* | 6/2021 | Balva | G01C 21/3682 |
| 2022/0067560 A1* | 3/2022 | Wu | G06N 5/048 |
| 2022/0120572 A9* | 4/2022 | Shoval | G01C 21/3492 |
| 2022/0230227 A1* | 7/2022 | Fan | G01C 21/3617 |

FOREIGN PATENT DOCUMENTS

| | | |
|---|---|---|
| CN | 107733954 A | 2/2018 |
| CN | 108241630 A | 7/2018 |
| WO | WO-2022087831 A1 * | 5/2022 |

OTHER PUBLICATIONS

Non-Final Office Action dated Oct. 7, 2021, issued in related U.S. Appl. No. 17/036,941 (47 pages).

* cited by examiner

… (1) …

SYSTEM AND METHOD FOR ALTERNATIVE DESTINATION RECOMMENDATION ON RIDESHARING PLATFORMS

CROSS-REFERENCE TO RELATED APPLICATION

This application claims the benefit of U.S. Provisional Patent Application No. 62/956,081, filed on Dec. 31, 2019. The entirety of the aforementioned application is incorporated herein by reference.

TECHNICAL FIELD

The disclosure relates generally to alternative destination recommendations on ridesharing platforms.

BACKGROUND

A ridesharing platform may match drivers of personal cars or taxis with riders to provide on-demand transportation services. When a rider opens the mobile app or website associated with the platform, he/she fills information like origin, destination, departure time (if not departing immediately). The app may show several trip options between the specified origin and destination for the rider to choose from. If a rider chooses one of the options, the platform may try to match the rider's choice with nearby drivers and send the request to the matched driver. If the matched driver accepts the request, the driver may then pick up the rider, take the rider to the destination and drop off the rider. In the existing ridesharing apps, a rider may only see a travel option between the rider-specified origin and destination One of the major challenges of a ridesharing platform is to balance the demand (e.g., riders) with the supply (e.g., drivers) in both temporal and spatial dimensions. A common practice to balance demand and supply is applying dynamic pricing, also called "surge pricing." The surge pricing applies a surge multiplier to the regular price to reflect a supply-demand imbalance. For example, the higher the demand is relative to the supply, the higher the surge multiplier will be. In oversupply or exact balanced situations, the surge multiplier will be one. However, this practice has an obvious disadvantage: with higher surge multipliers and prices, some riders may cancel their trips and lead to a loss to the platform. Therefore, it is desirable to design a novel way to balance the supply and demand in a ridesharing platform.

SUMMARY

Various embodiments of the specification include, but are not limited to, systems, methods, and non-transitory computer-readable media for alternative destination recommendations on ridesharing platforms.

In various implementations, a method for determining alternative destination recommendations on ridesharing platforms may include: receiving, by a computing device of a ridesharing platform from a terminal device, a trip request for a rider that comprises an origin and a destination; classifying, by the computing device of the ridesharing platform, the trip request into one of the plurality of trip purpose categories based at least on the origin and the destination of the trip request, the rider's information, and a classifier trained to predict the one trip purpose category of the trip request; in response to the one trip purpose category belonging to a preset group of trip purpose categories, determining, by the computing device of the ridesharing platform based on the one trip purpose category, one or more alternative destinations for the trip request, wherein the one or more alternative destinations share one or more features with the designation of the trip request; and sending, by the computing device of the ridesharing platform to the terminal device, the one or more alternative destinations.

In some embodiments, the classifier is trained based on training data comprising a plurality of historical trips labeled with a plurality of trip purpose categories, the training data comprising one or more of trip information, rider information, point-of-interest information, and the plurality of trip purpose categories of the plurality of historical trips.

In some embodiments, the training data are obtained at least partially by automatically sending, by the computing device of the ridesharing platform to a training rider's computing device, a query for the training rider to input a trip purpose category of a training trip that the training rider took; and labeling the training trip with the trip purpose category inputted by the training rider.

In some embodiments, the point-of-interest information of the plurality of historical trips for training the classifier comprises at least one of the following, for each of the plurality of historical trips comprising a destination: one or more point-of-interests (POI) within a preset range of the destination, wherein the one or more POIs are ranked by popularity.

In some embodiments, the rider information of a historical trip comprising a destination for training the classifier comprises at least one of the following: whether the destination is a home location or a work location; a travel frequency to the destination on weekdays; and a travel frequency to the destination on weekends.

In some embodiments, the trip information of a historical trip for training the classifier comprises at least one of the following: day-of-week of the trip; a start time of the trip; and a travel time duration of the trip.

In some embodiments, the classifier is trained as one of the following models: Random Forest (RF), Deep Neural Network (DNN), XGBoost, and logistic regression.

In some embodiments, the determining one or more alternative destinations for the trip request comprises: determining an estimated cost of the trip request, a service level of the trip request, and a business type of the destination of the trip request; identifying a plurality of point-of-interest (POI) locations of the business type within a range of the origin of the trip request; determining, for each of the POI locations, an estimated cost of a hypothetical trip with the service level from the origin to the POI location; determining one or more of the POIs locations with corresponding estimated costs of the hypothetical trips that are not greater than the estimated cost of the trip request; and identifying the one or more alternative destinations for the trip request from the one or more determined POI locations.

In some embodiments, the service level comprises at least one of the following: trip configuration of the trip request comprising solo trip or carpool trip; and vehicle configuration of the trip request comprising vehicle capacity or vehicle class.

In some embodiments, the method further comprises ranking the alternative destinations based on surge multipliers or matching probabilities of the alternative destinations; and displaying the ranked alternative destinations on the terminal device.

In some embodiments, the method further comprises identifying, by the computing device of the ridesharing platform, one or more of the plurality of historical trips in which alternative destinations were selected; and adding, by the computing device of the ridesharing platform, one or more of the plurality of trip purpose categories corresponding to the one or more identified historical trips to the preset group of trip purpose categories.

In some embodiments, the receiving a trip request that comprises an origin and a destination comprises: receiving the trip request comprising an initial origin from the terminal device; determining one or more alternative origins based on the initial origin; displaying the one or more alternative origin to the terminal device for the rider to select; and determining one of the one or more alternative origins selected by the rider as the origin of the trip request.

In another aspect of the present disclosure, a computing system may comprise one or more processors and one or more non-transitory computer-readable memories coupled to the one or more processors and configured with instructions executable by the one or more processors. Executing the instructions may cause the system to perform operations. The operations may include receiving, by a computing device of a ridesharing platform from a terminal device, a trip request for a rider that comprises an origin and a destination; classifying, by the computing device of the ridesharing platform, the trip request into one of the plurality of trip purpose categories based at least on the origin and the destination of the trip request, the rider's information, and a classifier trained to predict the one trip purpose category of the trip request; in response to the one trip purpose category belonging to a preset group of trip purpose categories, determining, by the computing device of the ridesharing platform based on the one trip purpose category, one or more alternative destinations for the trip request, wherein the one or more alternative destinations share one or more features with the designation of the trip request; and sending, by the computing device of the ridesharing platform to the terminal device, the one or more alternative destinations.

Yet another aspect of the present disclosure is directed to a non-transitory computer-readable storage medium configured with instructions executable by one or more processors to cause the one or more processors to perform operations. The operations may include receiving, by a computing device of a ridesharing platform from a terminal device, a trip request for a rider that comprises an origin and a destination; classifying, by the computing device of the ridesharing platform, the trip request into one of the plurality of trip purpose categories based at least on the origin and the destination of the trip request, the rider's information, and a classifier trained to predict the one trip purpose category of the trip request; in response to the one trip purpose category belonging to a preset group of trip purpose categories, determining, by the computing device of the ridesharing platform based on the one trip purpose category, one or more alternative destinations for the trip request, wherein the one or more alternative destinations share one or more features with the designation of the trip request; and sending, by the computing device of the ridesharing platform to the terminal device, the one or more alternative destinations.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

The approaches disclosed herein may recommend alternative destinations to a user (e.g., a rider) of a ridesharing platform according to the user's trip request. Recommending alternative destinations to a rider may be beneficial to the rider, a potential driver, the ridesharing platform, or any combination thereof, while still serving the original travel purpose. For example, the rider may be benefited because the recommended alternative destinations may provide new experiences to the rider, save the rider money, or save travel time. As another example, the potential driver may be benefited because the potential driver may have a higher chance to earn more money in later trips if a rider selects one of the alternative destinations that are in an undersupplied region (e.g., the undersupplied region may have a higher surge multiplier). As yet another example, the ridesharing platform may be benefited because recommending alternative destinations may effectively balance the demand and supply, and recommending destinations with higher carpool matching rates may increase the platform's profit.

The alternative destination recommendation described in this disclosure is different from existing destination recommendation features in ridesharing apps. The existing destination recommendation features involve "auto-complete" in the destination input bar or based on the most frequently visited places, in order to help the users locate their predetermined destination more easily. On the other hand, some embodiments of the alternative destination recommendation method may target at guiding users to some alternative destinations different from the predetermined destination, which may benefit both users and the platform. Furthermore, some embodiments of the alternative destination recommendation method may provide metrics like monetary cost and travel time of the alternative trips to help riders make better decisions. Since these metrics may vary by time and space, the recommended results will be dynamic. By contrast, features like autocomplete and the most frequently visited places do not provide the above information.

Figure 1:
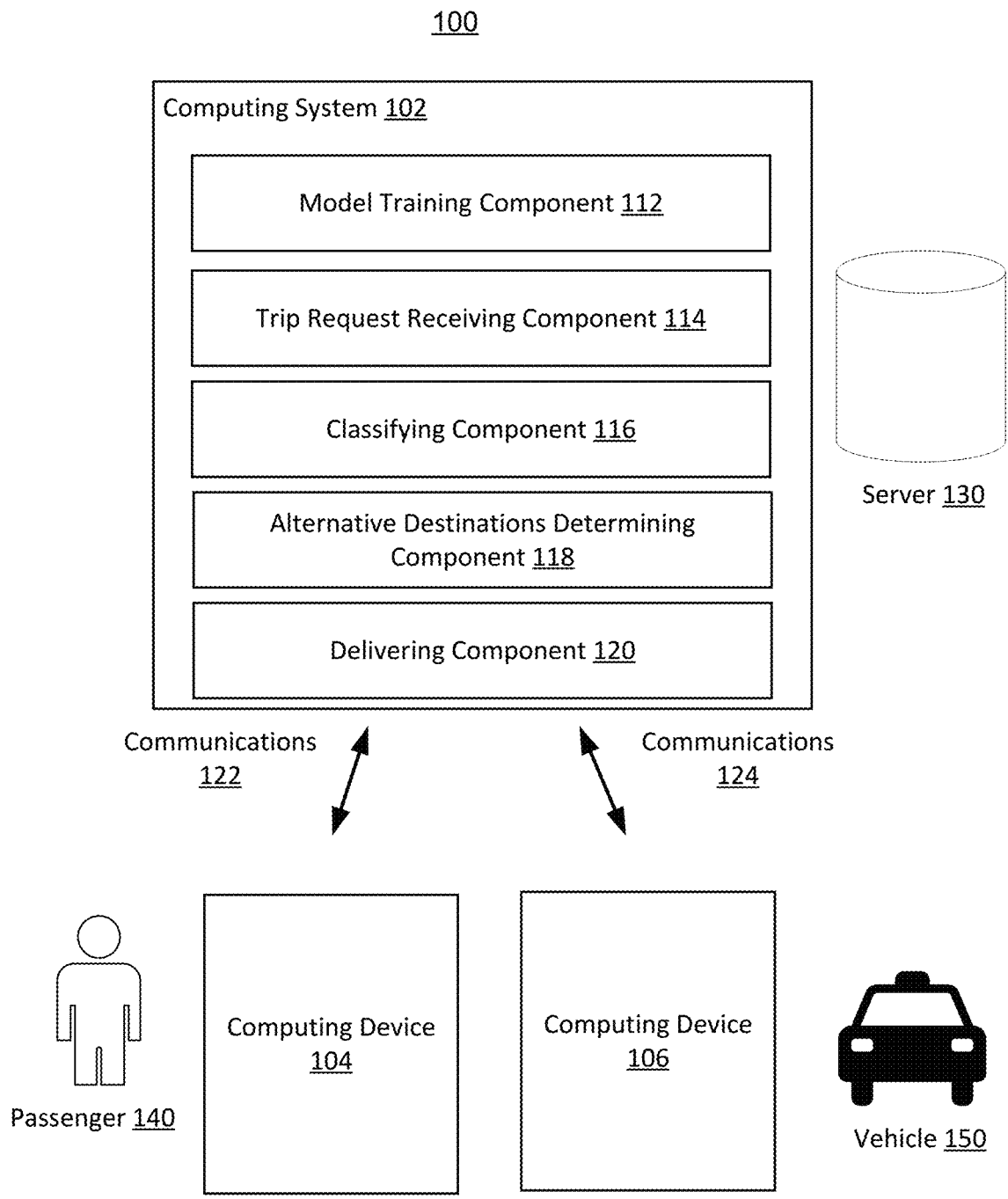
FIG. 1 illustrates an exemplary system to which techniques for alternative destination recommendation may be applied, in accordance with various embodiments.

FIG. 1 illustrates an exemplary system 100 to which techniques for alternative destination recommendation may be applied, in accordance with various embodiments. The example system 100 may include a computing system 102, a computing device 104, and a computing device 106. It is to be understood that although two computing devices are shown in FIG. 1, any number of computing devices may be included in the system 100. Computing system 102 may be implemented in one or more networks (e.g., enterprise networks), one or more endpoints, one or more servers (e.g., server 130), or one or more clouds. The server 130 may include hardware or software which manages access to a centralized resource or service in a network. A cloud may include a cluster of servers and other devices that are distributed across a network.

The computing devices 104 and 106 may be implemented on or as various devices such as a mobile phone, tablet, server, desktop computer, laptop computer, etc. The computing devices 104 and 106 may each be associated with one or more vehicles (e.g., car, truck, boat, train, autonomous vehicle, electric scooter, electric bike, etc.). The computing devices 104 and 106 may each be implemented as an in-vehicle computer or as a mobile phone used in association with the one or more vehicles. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ridesharing platform. The ridesharing platform may facilitate transportation service by connecting drivers of vehicles with passengers. The platform may accept requests for transportation from passengers, identify idle vehicles 150 to fulfill the requests through communications 124, arrange for pick-ups, and process transactions. For example, passenger 140 may use the computing device 104 to request a trip. The trip request may be included in communications 122. The computing device 104 may be installed with a software application, a web application, an API, or another suitable interface associated with the ridesharing platform.

In some embodiments, the computing system 102 may refer to a computing server of a ridesharing platform, which includes a model training component 112, a trip request receiving component 114, a classifying component 116, an alternative destination determining component 118, and a delivering component 120. The computing system 102 may include other components. The computing system 102 may include one or more processors (e.g., a digital processor, an analog processor, a digital circuit designed to process information, a central processing unit, a graphics processing unit, a microcontroller or microprocessor, an analog circuit designed to process information, a state machine, and/or other mechanisms for electronically processing information) and one or more memories (e.g., permanent memory, temporary memory, non-transitory computer-readable storage medium). The one or more memories may be configured with instructions executable by the one or more processors. The processor(s) may be configured to perform various operations by interpreting machine-readable instructions stored in the memory. The computing system 102 may be installed with appropriate software (e.g., platform program, etc.) and/or hardware (e.g., wires, wireless connections, etc.) to access other devices of the system 100.

In some embodiments, the model training component 112 may be configured to train a classifier to predict a trip purpose category for a given trip based on training data comprising a plurality of historical trips labeled with a plurality of trip purpose categories, wherein the training data comprises trip information, rider information, point-of-interest information, and the plurality of trip purpose categories of the plurality of historical trips. In some embodiments, the classifier may be trained as a random forest model (RF), a deep neural network (DNN), a logistic regression model, with the XGBoost method, or another suitable model or algorithm.

Exemplary trip information may include the day-of-week of the trip, a start time of the trip, and a travel time duration of the trip. Exemplary rider information may include whether the destination is a home location or a work location, a travel frequency to the destination on weekdays, and a travel frequency to the destination on weekends. Exemplary point-of-interest information (POI) may include one or more POI locations within a range of the destination, wherein the POI locations may be ranked by popularity (such as search volume or trip volume). Exemplary trip purpose categories may include home, work, school, shopping, food, social, pick-up, and so on.

In some embodiments, the plurality of trip purpose categories may be obtained by automatically sending, by the computing server to the given rider's computing device, a query for the given rider to input a trip purpose category of the given trip. This way, the given trip may be labeled with the trip purpose category input by the rider. In some other embodiments, such labels may also be obtained from third parties.

In some embodiments, the trip request receiving component 114 may be configured to receive a request from a rider's computing device for a ride or a trip. The rider's computing device may refer to a smartphone, a tablet, a computer, or another suitable smart device with an internet connection. The request may include various information about the trip requests, such as an origin, a destination, a service level (e.g., a solo trip or a carpool trip), one or more vehicle requirements (e.g., vehicle capacity, vehicle class), time of the request, an identifier of the rider that links to data of the rider's historical trips, point of interest (POI) locations, a proposed route, other suitable information, or any combination thereof.

In some embodiments, the classifying component 116 may be configured to classify the trip request into one of the plurality of trip purpose categories based at least on the origin and the destination of the trip request, the rider's information, and the trained classifier. As described above, the classifier in some embodiments may accept input such as the origin and destination of a trip, the rider's information, and other temporal/spatial information, and may generate one or more classifications for the trip. The classification may be in the form of a probability. For example, the purpose of a trip from home to work on Monday morning may be classified with a 95% probability as "work." As another example, the purpose of a trip from home to a restaurant on a Saturday evening may be classified with 85% probability as "food" or "social" if the rider does not work for the restaurant.

In some embodiments, the alternative destination determining component 118 may be configured to in response to the trip purpose category of the trip request belonging to a preset group of trip purpose categories, determine one or more alternative destinations for the trip that share one or more features with the designation of the request. In some embodiments, the preset group of trip purpose categories may encompass the types of trips to which alternative destination recommendations are appropriate. For example, alternative destination recommendations may be appropriate for trips in the categories of "shopping" or "food," but inappropriate for trips in the categories of "work" or "home." Once it is determined that the trip purpose of the trip request is one of the preset group of trip purpose categories, the alternative destinations for the trip request may be determined by: determining an estimated cost of the trip request, a service level of the trip request, and a business type of the destination of the trip request; identifying a plurality of point-of-interest (POI) locations of the business type within a range of the origin of the trip request; determining, for each of the POI locations, an estimated cost of a hypothetical trip with the service level from the origin to the POI location; determining one or more of the POIs locations with estimated costs of the hypothetical trips that are not greater than the estimated cost of the trip request; and identifying one or more alternative destinations for the trip request from the one or more determined POI locations. In some embodiments, the service level comprises at least one of the following: trip configuration of the trip request comprising solo trip or carpool trip; and vehicle configuration and the trip request comprising vehicle capacity or vehicle class.

In some embodiments, the alternative destinations may satisfy one or more enforced constraints and one or more optional constraints. For example, the enforced constraints may include (1) the recommended destination must be able to serve the same purpose with the initial destination, and (2) (hypothetical) trips to the recommended destination options must have monetary cost less than or equal to that of the initial destination with the same service level (solo or carpool). As another example, the optional constraints may include (1) hypothetical trips (trip options) to the recommended destinations should have time-cost less than or equal to that of the initial destination with the same service level (solo or carpool), (2) the recommended destinations should have greater undersupply issues compared to the initial destination, (3) for carpool trips, it is better if the recommended destination has a higher match rate than the initial destination (e.g., after this trip finishes, in the future there will be more matches), or the route towards the recommended destination has a higher match rate (e.g., there will be more matches along this trip). By considering the supply-demand imbalances in the initial destination and the alternative destinations, the described method may help drivers to earn more income in the long term (e.g., by serving orders from the under-supplied area) and the ride-sharing platform (e.g., if drivers can earn more through the regular payout, the ridesharing platform does not have to keep high driver incentives to attract drivers).

In some embodiments, the delivering component 120 may be configured to recommend the one or more alternative destinations to the rider's computing device. The recommendation may include one or more trip options (platform-determined trips) to the alternative destinations for the rider to select from. For example, the ride-hailing platform may determine a solo trip option and a carpool trip option to each of the alternative destinations. In some embodiments, the trip options to the alternative destinations may be ranked first before sent to the rider. The ranking of the trip options to the alternative destinations may be based on probabilities that the rider will choose the trip options, the supply-demand imbalance, the carpool matching probabilities, another suitable consideration, or any combination thereof.

In some embodiments, a binary classifier may be trained to predict, for each of the alternative destinations, a probability that the rider will choose a trip option from the origin to the alternative destination. The trip option may include various configurations of a hypothetical trip to the alternative destination, such as solo/carpool, vehicle level, capacity, route. There may be multiple trip options (various trip configuration combos) between the origin and the alternative destination. The binary classifier may accept input comprising one or more of the followings: a plurality of attributes of the trip option to the alternative destination (e.g., estimated waiting time for the hypothetical trip to the alternative destination, an estimated travel time of the hypothetical trip, an estimated price of the hypothetical trip), a quantified similarity between the initial destination of the trip request and the alternative destination, the rider's historical information, traffic information, weather information, and temporal information of the trip request.

In some embodiments, each trip option to the alternative destinations may be scored based on a weighted sum of various factors, including one or more of the followings: the above-described probability corresponding to the trip option to the alternative destination, a first delta/difference between a surge multiplier (or another suitable indicator of supply-demand imbalance in an area) of the alternative destination and a surge multiplier of the destination of the trip request, and a second delta/difference between carpool matching probabilities at the alternative destination and the destination of the trip request. The ranking score may be computed based on a first and a second hyper-parameters that applied to the first delta and the second delta, respectively.

Figure 2:
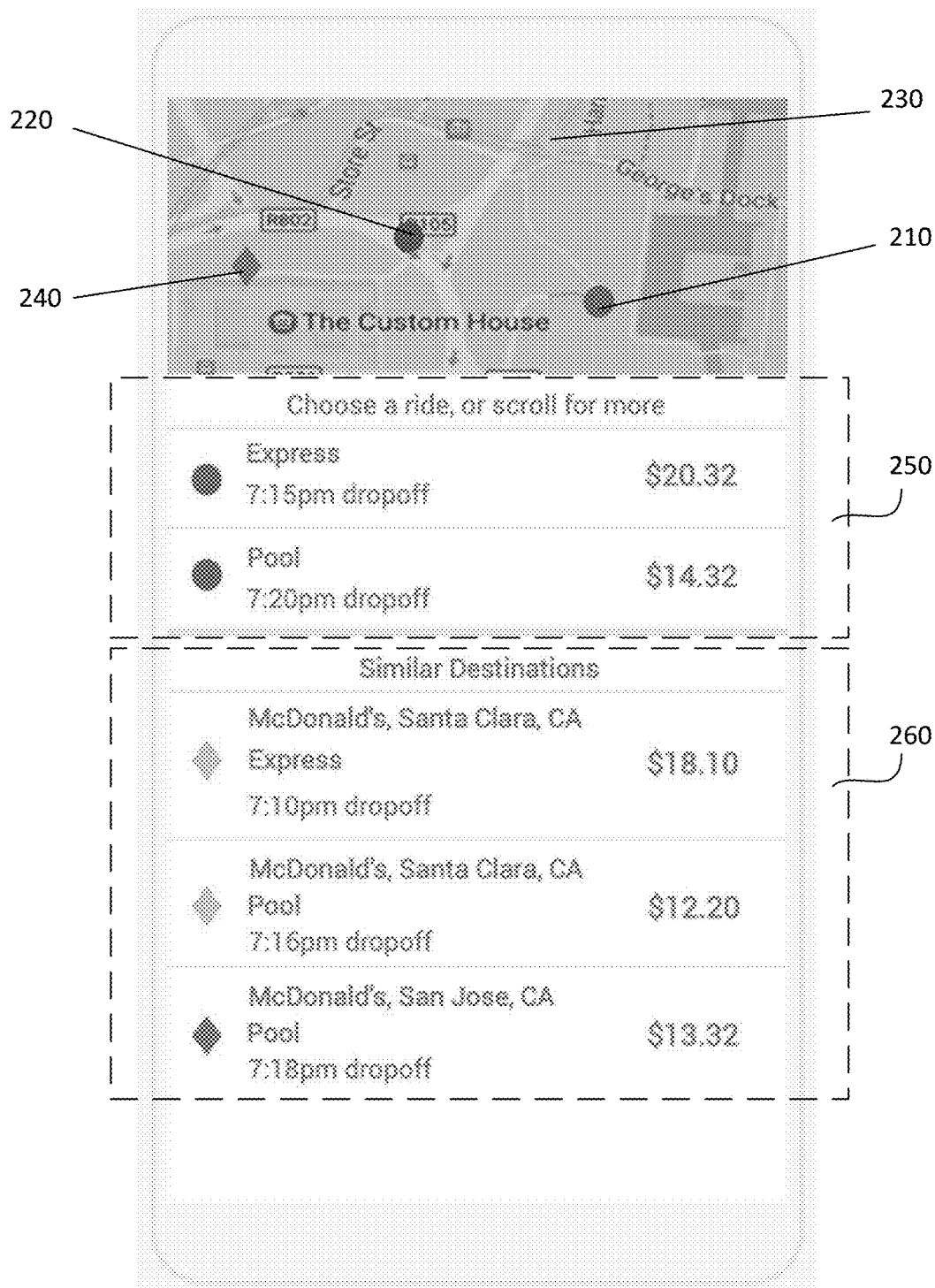
FIG. 2 illustrates an exemplary user interface (UI) design to which techniques for alternative destination recommendation may be applied, in accordance with various embodiments.

FIG. 2 illustrates an exemplary User Interface 200 (UI) design for alternative destination recommendation, in accordance with various embodiments. In some embodiments, a user may view trip origin 210, destination 220, as well as two recommended destinations 230 and 240 on the UI. In some embodiments, the options of the recommended destinations 260 may be shown below the regular options 250. In some embodiments, the options of the recommended destinations may be shown with price savings and travel time savings to help users better understand the benefits.

Figure 3:
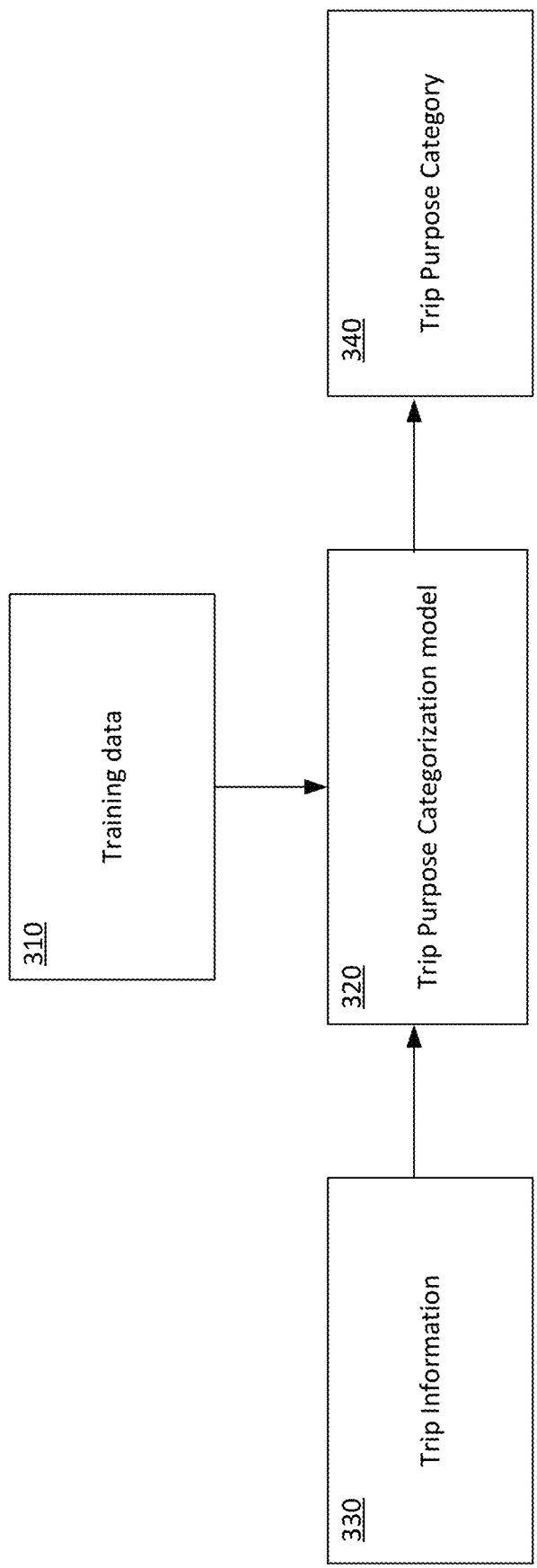
FIG. 3 illustrates an exemplary trip purpose determination method for alternative destination recommendation, in accordance with various embodiments.

FIG. 3 illustrates an exemplary trip purpose determination method for alternative destination recommendation, in accordance with various embodiments. Various factors may be considered when making destination recommendations. Some constraints may need to be strictly enforced (e.g., must-have constraints, required constraints), while others may be nice to have (e.g., nice-to-have constraints, optional constraints). For example, the recommended destinations may be required to be able to serve a same or similar purpose as the initial destination, or to have monetary cost less than or equal to that of the initial destination with the same service level (e.g., solo, carpool), another suitable must-have constraint, or any combination thereof. In some cases, especially for users that are not price-sensitive, the monetary cost of the recommended destinations may be allowed to be greater than the original cost by a predetermined margin. As another example, the recommended destinations may be desired to have a time cost less than or equal to that of the initial destination with the same service level (e.g., solo, carpool). As another example, the recommended destinations may have more severe undersupply issues compared to the initial destination in order to send more supply to the undersupply area to balance demand and supply. By doing so, the drivers may earn more income by serving more trips in the undersupply area, which may further help the ridesharing platform (e.g., if drivers can earn more through the regular payout, the ridesharing platform does not have to keep high driver incentives to attract drivers). As another example, for carpool options, the recommended destinations may have a higher carpool matching rate than the initial destination (e.g., after dropping off the rider at the recommended destination, the driver may have a higher chance to receive matched carpool requests), the routes towards the recommended destinations may have a higher carpool matching rate than the initial destination (e.g., the driver may receive matched carpool requests while serving the current trip), another suitable consideration that helps to increase the carpool matching rate, or any combination thereof.

In some embodiments, the benefits of the destination recommendation may vary based on different trip purposes (e.g., trip categories). There may be different ways to define trip purpose categories. For example, the trip purpose categories may include home, work, school, shopping, food, social, pick-up, etc. For some trip purposes such as food and shopping, users may be more willing to try and explore different locations. While for other trip purposes, it may not be suitable to recommend other destinations. Recommending destinations in such cases may harm user experience.

In some embodiments, machine learning techniques such as RF, DNN, XGBoost, logistic regression (e.g., softmax model in the multi-class context), or another suitable may be used to train a trip purpose classifier to categorize each trip request into one of a plurality of trip purpose categories. In some embodiments, in order to train the trip purpose classification model 320, training data 310 may be collected from historical trips that occurred in the ridesharing platform. The training process may consider various features associated with each of the plurality of historical trips. These features may include trip information (e.g., day-of-week, starting time, duration), rider information (e.g., whether the destination is a home location, whether the destination is a work location, travel frequency to the destination, travel frequency to the destination on weekdays, travel frequency to the destination on weekends), point-of-interest (POI) information (e.g., nearby POI, the popular/common POI types near the trip destination). In some embodiments, the plurality of historical trips collected may be labeled by various means. For example, the training data may be obtained by automatically sending a query for a rider to input a trip purpose category of a trip that the rider took; and labeling the training trip with the trip purpose category input by the training rider. Here, the "query" may refer to a certain form of in-app surveys (e.g., after a user finishes a trip, the ridesharing app may pop-up a window asking the user about the trip purpose). As another example, the training data may be obtained from third-party data (e.g., purchasing third-party data with trip purpose information, as well as other information needed), other suitable means, or any combination thereof. In some embodiments, these survey-based means of collecting labels may provide an initial set of training data, which may be expanded based on machine learning algorithms. For example, Generative Adversarial Network (GAN) may be applied to generate synthetic training data with labels based on the initial set of training data. The generated synthetic training data share similar data distributions and other similarities with the initial set of training data. Both the initial set and the generated synthetic training data may be used to train the trip purpose classifier.

In some embodiments, the ridesharing platform may extract various trip information 330 from the trip request. The trip information may include some or all of the above-described features of the historical trips, such as the origin and destination, the rider's historical data and profile, etc. The trip information may then be fed into the trained trip purpose classification model 320 to yield a trip purpose category 340 for the trip request.

Figure 4:
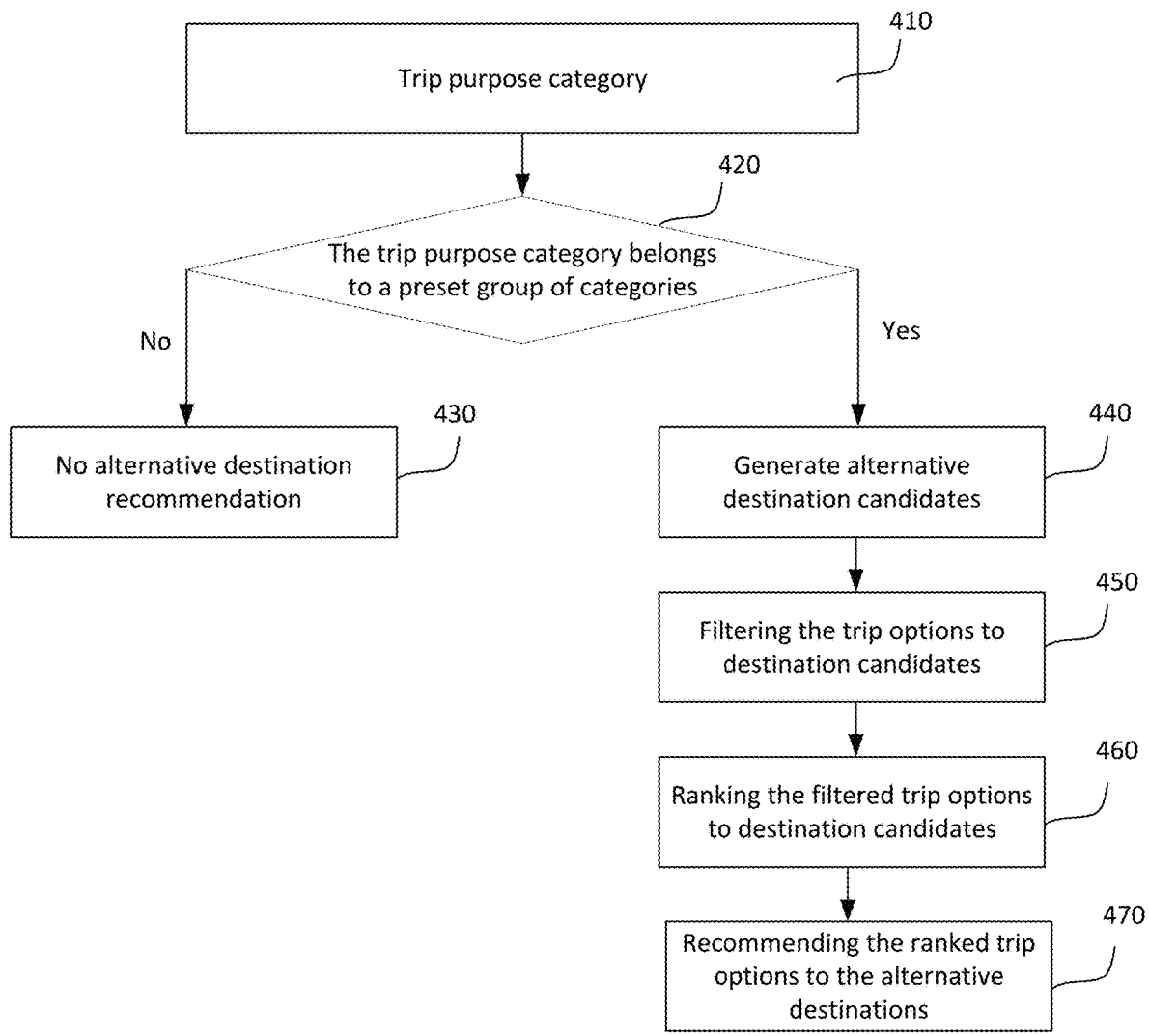
FIG. 4 illustrates an exemplary flow for alternative destination recommendation, in accordance with various embodiments.

FIG. 4 illustrates an exemplary flow 400 for alternative destination recommendation, in accordance with various embodiments. In some embodiments, alternative destination recommendation may make sense for certain trip purpose categories such as shopping and food, because the corresponding riders may be more willing to explore different locations. In some embodiments, after obtaining the trip purpose category of a trip at step 410, for example, by using the trained trip purpose classification model 320 in FIG. 3, it may be determined whether the trip purpose category belongs to a preset group of categories at step 420. If not, there may be no alternative destination recommendation to be offered for the trip at step 430 (e.g., if the initial destination is a rider's work address on a Monday morning, he/she may not accept any alternative destination recommendation). If the trip purpose category belongs to the preset group of categories (e.g., the rider may be willing to try alternative destinations if certain conditions are met), the flow 400 may proceed to step 440 where one or more alternative destination candidates are generated.

In some embodiments, the preset group of categories at step 420 may be determined manually and/or based on one or more of the plurality of historical trips in which alternative destinations were selected. For example, the preset group of categories may be configured to include one or more trip categories based on empirical experiences, such as shopping and/or dining. As another example, the ridesharing platform may explore other trip categories where the riders are willing to accept recommended alternative destinations, for example, by sending alternative destination recommendations to riders requesting trips to restaurants, parks, hospitals, beaches, tourist attractions, locations in downtowns. The riders' selections may be recorded and accumulated to learn one or more categories in which the riders will select the recommendations.

In some embodiments, the one or more alternative destination candidates may be generated by searching for POI locations of the same business type as the initial destination within a certain range of the origin. The range may be determined by the ridesharing platform, or by the rider's preference.

In some embodiments, each of the alternative destination candidates may be filtered at step 450. In some embodiments, the alternative destination candidates may be filtered based on estimated monetary costs (estimated by the ridesharing platform). The alternative destination candidates may be filtered by determining a first trip option to travel from the origin to the initial destination, wherein the first trip option shares trip configurations with the trip option from the origin to the alternative destination; determining a first estimated cost corresponding to the first trip option; for each of the alternative destination candidates, determining a second estimated cost corresponding to a trip option from the origin to the alternative destination candidate; and filtering out the trip option from the origin to the alternative destination candidate when the second estimated cost is greater than the first estimated cost.

For example, assuming the estimated price of a trip option between the origin and $D_o$ (the initial destination) with service level k (e.g., a service level may be defined as a combination of travel configurations, like solo or carpool, vehicle capacity, regular/luxury) is $C_{ok}$, the estimated price of the trip between the origin and one recommended destination $D_i$ ($1 \leq i \leq M$) with service level k is $C_{ik}$, where M is the number of alternative destination candidates, only the destinations with $C_{ik} \leq C_{ok}$ may be recommended to the riders (riders may have no motivations to pay more). After filtering the destination candidates based on the estimated monetary cost, the set of destination candidates that do not cost more may be denoted as S (i.e., $\forall i \in S$, $C_{ik} \leq C_{ok}$). If each destination has K service levels, there may be KM cases to be checked in total.

In some embodiments, the above-described alternative destination recommendation method may be used in combination with other trip recommendation techniques, such as alternative origin recommendation. For example, when the rider specifies an initial origin and an initial destination in a trip request, the platform may automatically recommend (e.g., by displaying) one or more alternative origins for the rider to consider. The alternative origins are usually within a short walking distance from the initial origin and may have a shorter waiting time, a higher matching probability, and/or a lower price. When the rider selects one of the recommended origins, the above-described alternative destination recommendation method may be executed based on the new origin.

In some embodiments, the remaining destination candidates after the filtering may be ranked at step 460 before being sent to the rider at step 470. An exemplary method for ranking the destination candidates may refer to FIG. 5.

Figure 5:
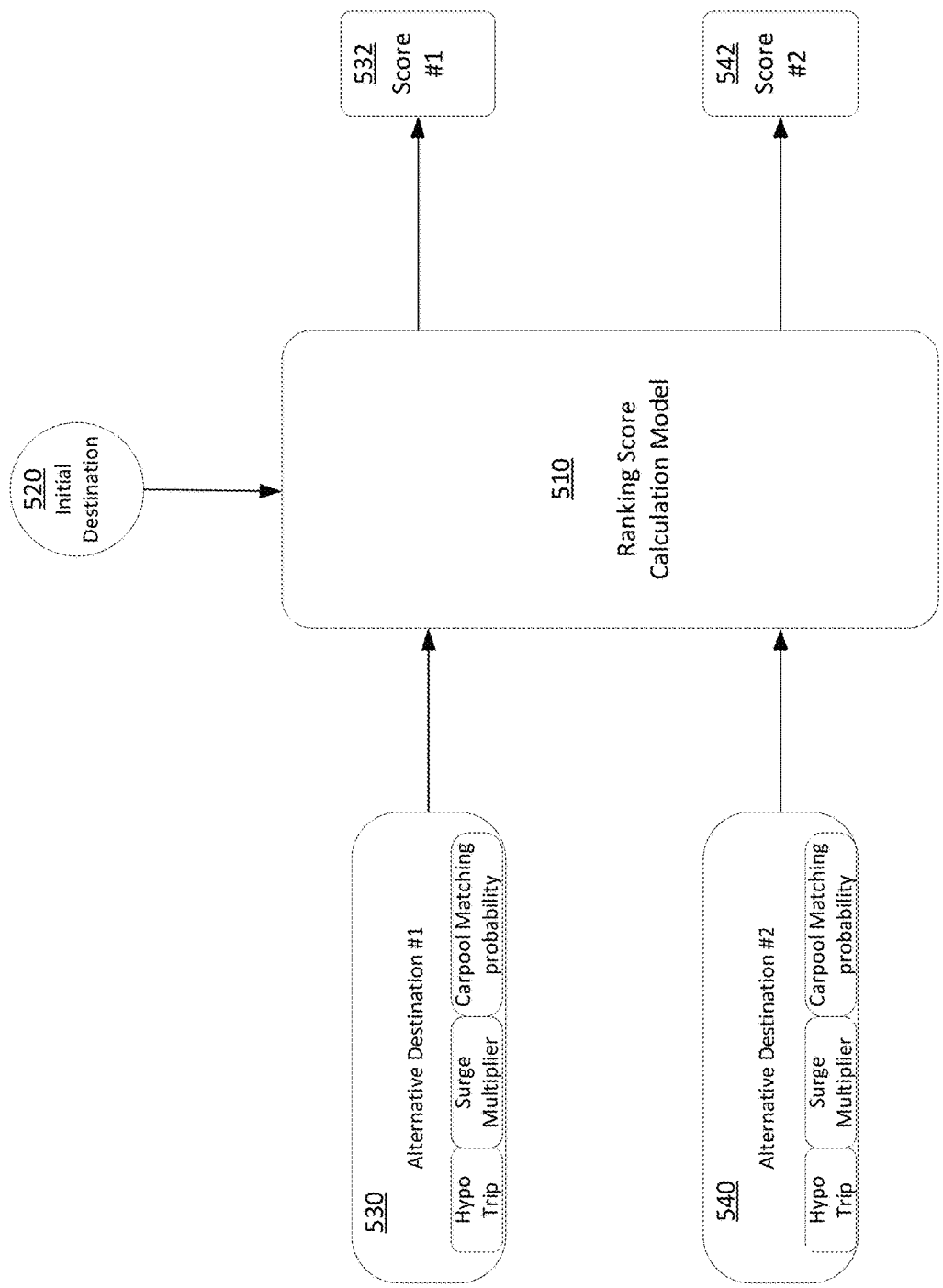
FIG. 5 illustrates an exemplary method for ranking alternative destinations in accordance with various embodiments.

FIG. 5 illustrates an exemplary method for ranking alternative destinations for a ridesharing platform, in accordance with various embodiments. FIG. 5 includes a ranking score calculation model 510 to compute a score for each of the alternative destinations the ridesharing platform prepares to send to the rider who requested a trip. The ranking score calculation model 510 may consider various factors in order to score an alternative destination. The factors may include probabilities that the rider will choose the alternative destinations, the need to improve the supply-demand imbalance, the carpool matching probabilities, another suitable consideration, or any combination thereof. In some embodiments, rather than ranking the alternative destinations, the method in FIG. 5 ranks trip options to the alternative destinations, and recommend the ranked trip options. For example, for each alternative destination, multiple trip options may be determined and ranked, and each trip option may include a combination of various trip configurations, such as solo trip, carpool trip, route, vehicle capacity, etc.

In some embodiments, the ranking score calculation model 510 may include a binary classifier (also called machine-learning classifier) that predicts, for each of the alternative destinations, a probability that the rider will choose a trip option to the alternative destination. In some embodiments, the alternative destinations may be ranked, when being delivered to the rider's computing device, based on the predictions generated by the binary classifier for the alternative destinations. In some embodiments, the classifier may be trained based on a plurality of historical trip requests associated with the rider and/or other riders sharing similarities with the rider. The plurality of trip requests may include a plurality of trip options selected by the rider and a plurality of trip options skipped by the rider. The classifier may be trained based on the plurality of trip options selected by the rider as positive samples and a plurality of trip options skipped by the rider as negative samples.

In some embodiments, the input to the classifier may include one or more of the following: attributes of the alternative destination (e.g., an estimated waiting time for a hypothetical trip to the alternative destination, an estimated travel time of the hypothetical trip, an estimated price of the hypothetical trip); a quantified similarity between the destination of the trip request and the alternative destination (e.g., business type, capacities, customer ratings, parking availabilities, average costs/prices, solo or carpool, destination attributes, such as whether this place is a central business district (CBD), distance to home, or events happening near the destination); the rider's historical information (e.g., a historical probability of choosing a solo trip or a carpool trip, a historical probability of choosing an alternative destination); and temporal and other information of the trip request (e.g., day-of-week, hour-of-day, weather).

In some embodiments, the quantified similarity between the initial destination and the alternative destination may be obtained by: obtaining one or more first key words of the initial destination and one or more second key words of the alternative destination; and determining a quantified similarity between the initial destination and the alternative destination based on word embeddings of first keywords and the second key words; wherein the input to the classifier further comprises the quantified similarity between the initial destination and the alternative destination. For example, the keywords of the destinations may be obtained online (from online descriptions of the destinations), and the word embedding may refer to language modeling and feature learning techniques in natural language processing (NLP) where words or phrases from the vocabulary are mapped to vectors of real numbers. The distance (e.g., Euclidean distance) between the vectors of two words may indicate a semantic similarity between the two words.

For example, assuming the rider's initial destination is "McDonald's," three alternative destinations may be ranked in the following order solely based on the similarity between the destination of the trip request and the alternative destination: McDonald's in another place, Burger King, and Taco Bell. McDonald's in another place provides precisely the same food, Burger King provides similar American fast food, and Taco Bell sells Mexico fast food. Therefore, the similarity score decreases in the same order. As another example, the alternative destination candidates may be ranked by their probabilities to be chosen by the rider, which may be represented by a weighted sum of the similarity between the destination of the trip request and the alternative destination, attributes of the alternative destination, the rider's historical information, temporal and other information of the trip request.

In some embodiments, various machine learning methods may be used to model this binary classification problem, such as logistic regression, decision tree, RF, neural networks (e.g., DNN), etc. The class probability calculated from the model may be used to rank different destination candidates.

In some embodiments, the features considered by the ranking model 510 may further include factors related to the platform's benefit, such as the difference between the supply-demand imbalance scores of the initial destination and an alternative destination. That is, the ranking model 510 may generate a ranking score for an alternative destination by determining a first supply-demand imbalance score of the initial destination and a second supply-demand imbalance score of the alternative destination; wherein the generating a score for each of the alternative destinations based at least on the probability comprises: generating the score for the alternative destination based at least on a weighted sum of (1) the probability and (2) a difference between the first supply-demand imbalance score and the second supply-demand imbalance score.

For example, a surge multiplier $s_i$ may reflect the supply-demand imbalance in destination i, so it may be directly used to quantify the supply-demand imbalance or the destination i, and the surge difference may be defined as $\Delta s_i = s_i - s_o$, where $s_o$ is the surge multiplier of the initial destination. There may be other forms of indicators reflecting the supply-demand imbalance in a destination, which is not limited in this specification. Here, $s_i$ is usually positively correlated with the demand-supply ratio, which means that $s_i$ is greater in more under-supplied areas.

In some embodiments, the ranking model 510 may further consider the difference between the carpool matching probabilities of the initial destination and an alternative destination. That is, the ranking model 510 may generate a ranking score for an alternative destination by determining a first carpool matching probability of the initial destination and a second carpool matching probability of the alternative destination; wherein the generating a score for each of the alternative destinations based at least on the probability comprises: generating the score for the alternative destination based at least on a weighted sum of (1) the probability and (2) a difference between the first carpool matching probability and the second carpool matching probability For example, $m_i$ may be used to represent the carpool matching probability of destination i. The difference of carpool matching probabilities may be defined as $\Delta m_i = m_i - m_o$, where $m_o$ is the carpool matching probability of the initial destination. This factor related to the carpool service may be considered regardless of whether the service level k covers carpool or not, because the benefit for the platform is targeting for a future time instead of now, e.g., a solo service which positions a driver (supply) to a destination with a higher carpool matching probability may increase the carpool trips in the future.

In some embodiments, if the ranking model 510 considers all three aforementioned factors (e.g., probability of choosing this option, surge difference, pool matching probability difference), the overall ranking score of a destination candidate may be calculated as a weighted sum:

$$v_{ik} = p_{ik} + \beta_1 \Delta s_i + \beta_2 \Delta m_i$$

where, $v_{ik}$ may refer to the ranking score ("value") of destination i with service level k, $\beta_1$ and $\beta_2$ may refer to hyper-parameters to weight the considered components, and $p_{ik}$ may refer to the probability of choosing the option of destination i with service level k. The optimal values of these parameters may be searched by grid search, random search, or Bayesian optimization by maximizing certain business metrics while considering the tradeoffs between them. For example, at each search point (when $\beta_1$ and $\beta_2$ are fixed at this step), a run of simulation may be executed over historical data to perform corresponding ranking and generate final metrics. The generated metrics across all the searched points may be compared to find the optimal one. The metrics may include platform profit (e.g., represented as "contribution margin", profit rate, profit divided by Gross Merchandise Value (GMV)), number of trips, driver earnings, etc.

Referring back to FIG. 5, the features of the alternative destination #1 530 and the alternative destination #2 540 may be extracted and fed into the ranking model 510. The features may include the features mentioned above, such as attributes of hypothetical trips to the corresponding alternative destinations, the indicators of supply-demand imbalance in the destinations, carpool matching probabilities, etc. The same features may also be extracted from the initial destination 520 and fed into the ranking model 510. The ranking model 510 may then generates scores for the alternative destinations, such as score 532 for the alternative destination #1 530, and score 542 for the alternative destination #2 540. The scores of the alternative destinations may be used to rank the recommendations on the rider's computing device (also called a terminal device).

Figure 6A:
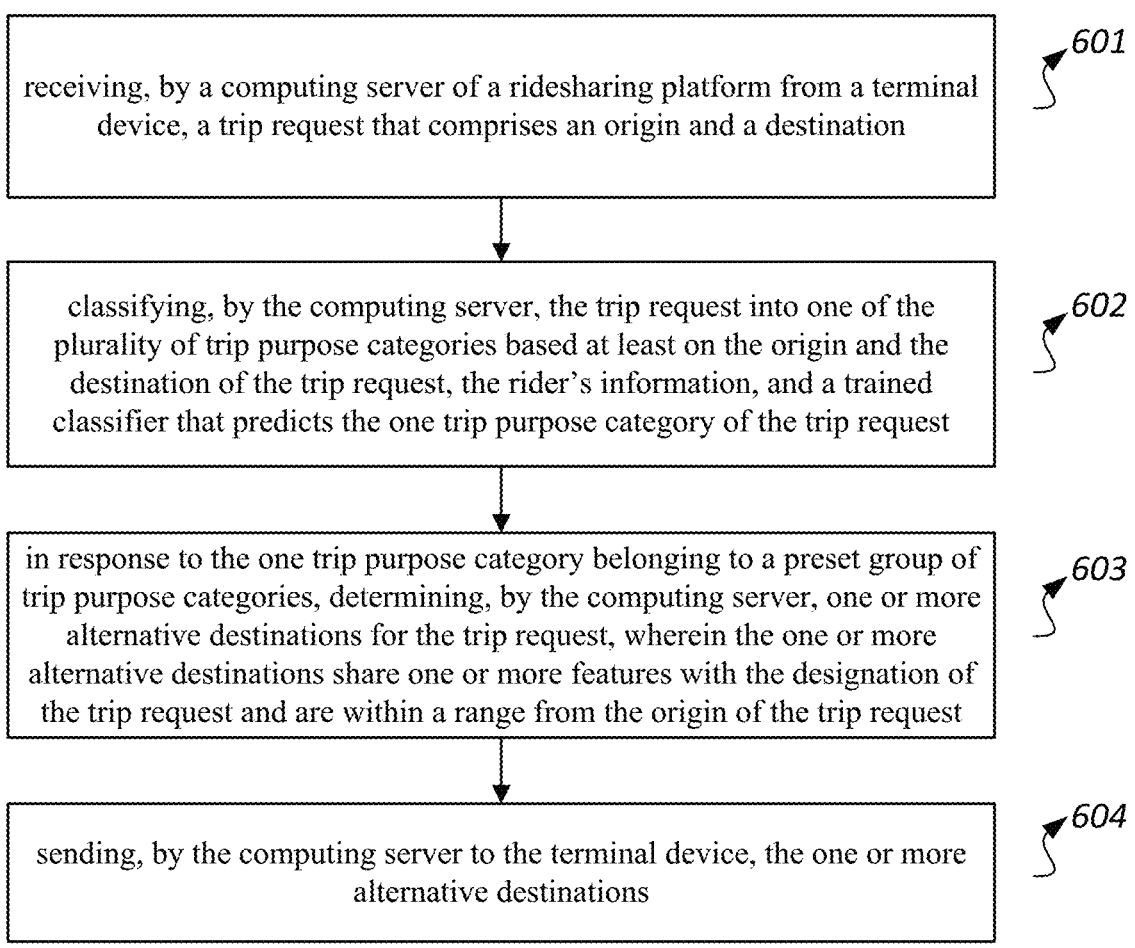
FIG. 6A illustrates an exemplary method for alternative destination recommendations in accordance with various embodiments.

FIG. 6A illustrates an exemplary method 600A for alternative destination recommendations in accordance with various embodiments. The method 600A may be implemented in an environment shown in FIG. 1. The method 600A may be performed by a device, apparatus, or system illustrated by FIGS. 1-5, such as the system 102. Depending on the implementation, the method 600A may include additional, fewer, or alternative steps performed in various orders or in parallel.

Block 601 includes receiving, by a computing server of a ridesharing platform from a terminal device, a trip request that comprises an origin and a destination.

Block 602 includes classifying, by the computing server, the trip request into one of the plurality of trip purpose categories based at least on the origin and the destination of the trip request, the rider's information, and a trained classifier that predicts the one trip purpose category of the trip request. In some embodiments, the trained classifier is trained based on training data comprising a plurality of historical trips labeled with a plurality of trip purpose categories, the training data comprising trip information, rider information, point-of-interest information, and the plurality of trip purpose categories of the plurality of historical trips. In some embodiments, the training data is obtained by automatically sending, by the computing device of the ridesharing platform to a historical rider's computing device, a query for the historical rider to input a trip purpose category of a historical trip that the historical rider took; and labeling the historical trip with the trip purpose category input by the historical rider. In some embodiments, the classifier is trained as one of the following models: Random Forest (RF), Deep Neural Network (DNN), XGBoost, and logistic regression.

In some embodiments, the point-of-interest information of the plurality of historical trips for training the classifier comprises at least one of the following: one or more pointof-interests (POI) within a range of the destination, wherein the one or more POIs are ranked by popularity. In some embodiments, the rider information of the plurality of historical trips for training the classifier comprises at least one of the following: whether the destination is a home location or a work location; a travel frequency to the destination on weekdays; and a travel frequency to the destination on weekends. In some embodiments, the trip information of the plurality of historical trips for training the classifier comprises at least one of the following: day-of-week of the trip; a start time of the trip; and a travel time duration of the trip.

Block 603 includes in response to the one trip purpose category belonging to a preset group of trip purpose categories, determining, by the computing server, one or more alternative destinations for the trip request, wherein the one or more alternative destinations share one or more features with the designation of the trip request. In some embodiments, the determining one or more alternative destinations for the trip request comprises: determining an estimated cost of the trip request, a service level of the trip request, and a business type of the destination of the trip request; identifying a plurality of point-of-interest (POI) locations of the business type within a range of the origin of the trip request; determining, for each of the POI locations, an estimated cost of a hypothetical trip with the service level from the origin to the POI location; determining one or more of the POIs locations with estimated costs of the hypothetical trips that are not greater than the estimated cost of the trip request; and identifying one or more alternative destinations for the trip request from the one or more determined POI locations. In some embodiments, the service level comprises at least one of the following: trip configuration of the trip request comprising solo trip or carpool trip; and vehicle configuration of the trip request comprising vehicle capacity or vehicle class.

Block 604 includes sending, by the computing server to the terminal device, the one or more alternative destinations.

In some embodiments, the method 600A may further comprise constructing a binary classifier to predict, for each of the alternative destinations, a probability that the rider will choose the alternative destination, wherein the binary classifier accepts input comprising: a plurality of attributes of the alternative destination including an estimated waiting time for a hypothetical trip to the alternative destination, an estimated travel time of the hypothetical trip, an estimated price of the hypothetical trip, a quantified similarity between the destination of the trip request and the alternative destination, historical information of the rider, and temporal information of the trip request; and ranking the one or more alternative destinations based on predictions generated by the binary classifier for the one or more alternative destinations.

In some embodiments, the method 600A may further comprise identifying, by the computing device, one or more of the plurality of historical trips in which alternative destinations were selected; and adding, by the computing device, one or more of the plurality of trip purpose categories corresponding to the one or more identified historical trips to the preset group of trip purpose categories.

In some embodiments, the method 600A may further comprise determining, by the computing device, a ranking score for each of the alternative destinations based at least on a weighted sum of: a first delta between a surge multiplier of the alternative destination and a surge multiplier of the destination of the trip request, and a second delta between carpool matching probabilities at the alternative destination and the destination of the trip request; and ranking, by the computing device, the one or more alternative destinations based on corresponding ranking scores.

Figure 6B:
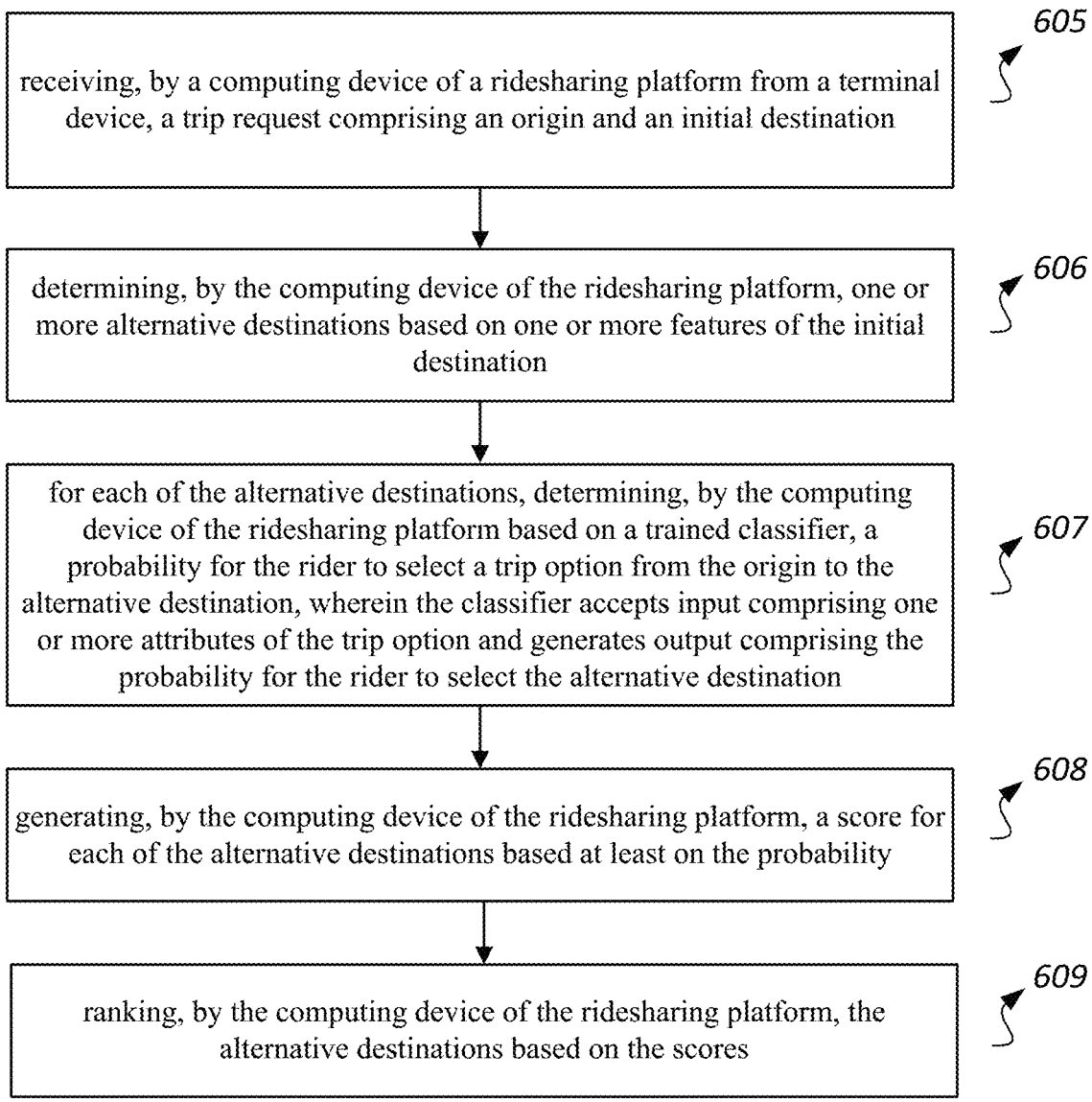
FIG. 6B illustrates an exemplary method for ranking alternative destination recommendations in accordance with various embodiments.

FIG. 6B illustrates an exemplary method 600B for ranking alternative destination recommendations in accordance with various embodiments. The method 600B may be implemented in an environment shown in FIG. 1. The method 600B may be performed by a device, apparatus, or system illustrated by FIGS. 1-6A, such as the system 102. The method 600B may be implemented to rank the alternative destination recommendations generated by the method 600A in FIG. 6A. Depending on the implementation, the method 600B may include additional, fewer, or alternative steps performed in various orders or in parallel.

Block 605 includes receiving, by a computing device of a ridesharing platform from a terminal device, a trip request comprising an origin and an initial destination.

Block 606 includes determining, by the computing device of the ridesharing platform, one or more alternative destinations based on one or more features of the initial destination. In some embodiments, the one or more features of the initial destination comprise: a classification of a business type of the initial destination; and a location of the initial destination.

Block 607 includes for each of the alternative destinations, determining, by the computing device of the ridesharing platform based on a trained machine-learning classifier, a probability for the rider to select a trip option from the origin to the alternative destination, wherein the classifier accepts input comprising one or more attributes of the trip option and generates output comprising the probability for the rider to select the alternative destination. In some embodiments, the one or more attributes of the trip option from the origin to the alternative destination comprise one or more of the following: estimated waiting time; estimated travel time; estimated cost; solo or carpool configuration; and one or more features of the alternative destination. In some embodiments, the input to the classifier further comprising one or more of the following: one or more features derived from the rider's historical trips, comprising a probability of choosing carpool or solo trips, and a probability of selecting a destination; temporal information of the trip request; traffic information; and weather information.

Block 608 includes generating, by the computing device of the ridesharing platform, a score for each of the alternative destinations based at least on the probability.

Block 609 includes ranking, by the computing device of the ridesharing platform, the alternative destinations based on the scores.

In some embodiments, the method 600B may further comprise: filtering the alternative destinations by: determining, by the computing device of the ridesharing platform, a first trip option to travel from the origin to the initial destination, wherein the first trip option shares trip configurations with the trip option from the origin to the alternative destination; determining, by the computing device of the ridesharing platform, a first estimated cost corresponding to the first trip option; for each of the alternative destinations, determining, by the computing device of the ridesharing platform, a second estimated cost corresponding to the trip option from the origin to the alternative destination; and skipping, by the computing device of the ridesharing platform, the trip option from the origin to the alternative destination when the second estimated cost is greater than the first estimated cost.

In some embodiments, method 600B may further comprise: displaying, by the computing device of the ridesharing platform, at least one of the alternative destinations on the terminal device with a highest score.

In some embodiments, method 600B may further comprise: obtaining one or more first key words of the initial destination and one or more second key words of the alternative destination; and determining a quantified similarity between the initial destination and the alternative destination based on word embeddings of first key words and the second key words; wherein the input to the classifier further comprises the quantified similarity between the initial destination and the alternative destination.

In some embodiments, method 600B may further comprise: determining a first supply-demand imbalance score of the initial destination and a second supply-demand imbalance score of the alternative destination; wherein the generating a score for each of the alternative destinations based at least on the probability comprises: generating the score for the alternative destination based at least on a weighted sum of (1) the probability and (2) a difference between the first supply-demand imbalance score and the second supply-demand imbalance score. In some embodiments, the first supply-demand imbalance score comprises a surge multiplier of the initial destination, and the second supply-demand imbalance score comprises a surge multiplier of the alternative destination.

In some embodiments, method 600B may further comprise: determining a first carpool matching probability of the initial destination and a second carpool matching probability of the alternative destination; wherein the generating a score for each of the alternative destinations based at least on the probability comprises: generating the score for the alternative destination based at least on a weighted sum of (1) the probability and (2) a difference between the first carpool matching probability and the second carpool matching probability.

In some embodiments, method 600B may further comprise: obtaining a plurality of historical trip requests from the rider, wherein the historical trip requests comprises a plurality of trip options selected by the rider and a plurality of trip options skipped by the rider; and training the classifier based on the plurality of trip options selected by the rider as positive samples and plurality of trip options skipped by the rider as negative samples.

Figure 7:
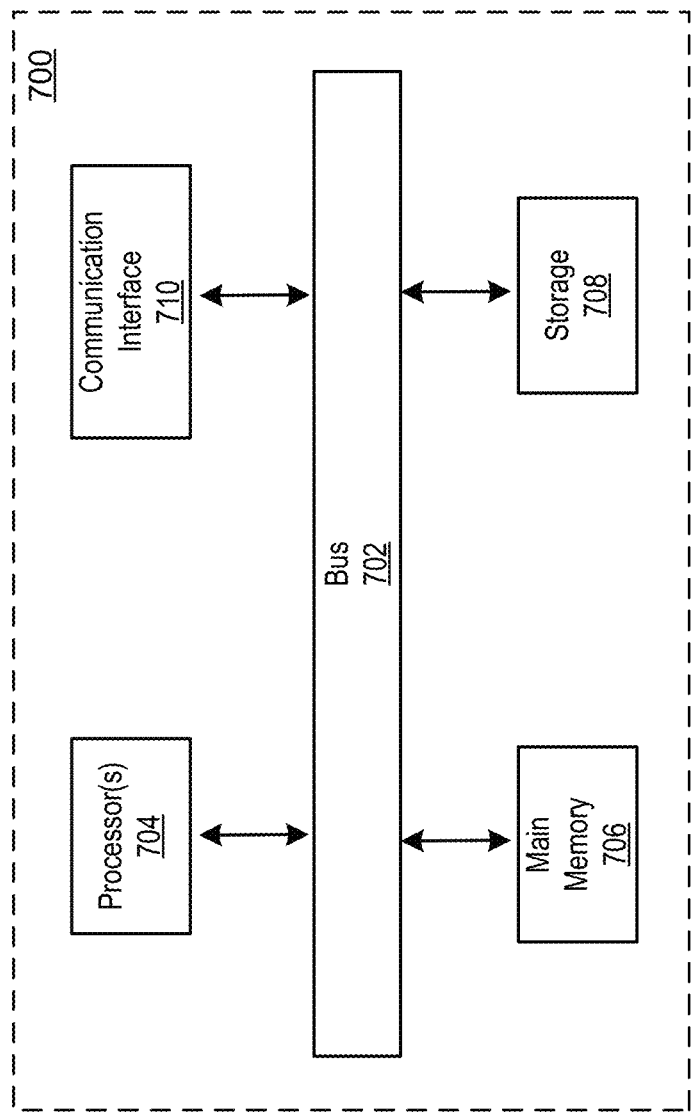
FIG. 7 is a block diagram that illustrates a computer system upon which any of the embodiments described herein may be implemented.

FIG. 7 is a block diagram that illustrates a computer system 700 upon which any of the embodiments described herein may be implemented. The computer system 700 includes a bus 702 or another communication mechanism for communicating information, one or more hardware processors 704 coupled with bus 702 for processing information. Hardware processor(s) 704 may be, for example, one or more general-purpose microprocessors.

The computer system 700 also includes a main memory 706, such as random-access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein.

For example, the computing system 700 may be used to implement the computing system 102, the model training component 112, the trip request receiving component 114, the classifying component 116, the alternative destinations determining component 118, and the delivering component shown in FIG. 1. As another example, the process/method shown in FIGS. 3-6 and described in connection with this figure may be implemented by computer program instructions stored in main memory 706. In alternative embodiments, hard-wired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method for recommending alternative destinations, comprising:
    receiving, by a computing device of a ridesharing platform from a terminal device, a trip request for a rider that comprises an origin and a destination;
    classifying, by the computing device of the ridesharing platform, the trip request into one of a plurality of trip purpose categories based at least on the origin and the destination of the trip request, the rider's information, and a classifier trained to predict the one trip purpose category of the trip request;
    in response to the one trip purpose category belonging to a preset group of trip purpose categories:
        determining, by the computing device of the ridesharing platform based on the one trip purpose category, one or more alternative destinations for the trip request, wherein the one or more alternative destinations share one or more features with the destination of the trip request;
        ranking the one or more alternative destinations; and
        displaying, in addition to the destination from the trip request, the ranked one or more alternative destinations on the terminal device;
    wherein the preset group of trip purpose categories is determined by at least:
        identifying one or more historical trips in which alternative destinations were recommended and accepted by one or more historical users; and
        adding one or more trip purpose categories corresponding to the one or more historical trips into the preset group of trip purpose categories.

2. The computer-implemented method of claim 1, wherein the classifier is trained based on training data comprising a plurality of historical trips labeled with a plurality of trip purpose categories, wherein for each of the plurality of historical trips, the training data comprises one or more of the following: trip information of the historical trip, rider information of the historical trip, point-of-interest information of the historical trip, and a label representing a trip purpose category of the historical trip.

3. The method of claim 2, wherein the training data are obtained at least partially by:
    automatically sending, by the computing device of the ridesharing platform to a training rider's computing device, a query for the training rider to input a trip purpose category of a training trip that the training rider took; and
    labeling the training trip with the trip purpose category inputted by the training rider.

4. The method of claim 2, wherein the point-of-interest information of the historical trip comprises at least one of the following, for each of the plurality of historical trips comprising a destination:
    a plurality of point-of-interests (POIs) within a preset range of the destination, wherein the plurality of POIs are ranked by popularity.

5. The method of claim 2, wherein the trip information of the historical trip comprises a destination of the historical trip, and the rider information of the historical trip comprises at least one of the following:
    whether the destination is a home location or a work location;
    a travel frequency to the destination on weekdays; and
    a travel frequency to the destination on weekends.

6. The method of claim 2, wherein the trip information of the historical trip for training the classifier comprises at least one of the following:
    day-of-week of the trip;
    a start time of the trip; and
    a travel time duration of the trip.

7. The method of claim 1, wherein the classifier is trained as one of the following models: Random Forest (RF), Deep Neural Network (DNN), XGBoost, and logistic regression.

8. The method of claim 1, wherein the determining one or more alternative destinations for the trip request comprises:
    determining an estimated cost of the trip request, a service level of the trip request, and a business type of the destination of the trip request;
    identifying a plurality of point-of-interest (POI) locations of the business type within a range of the origin of the trip request;
    determining, for each of the POI locations, an estimated cost of a hypothetical trip with the service level from the origin to the POI location;
    determining one or more of the POIs locations with corresponding estimated costs of the hypothetical trips that are not greater than the estimated cost of the trip request; and
    identifying the one or more alternative destinations for the trip request from the one or more determined POI locations.

9. The method of claim 8, wherein the service level comprises at least one of the following:
    trip configuration of the trip request comprising solo trip or carpool trip; and
    vehicle configuration of the trip request comprising vehicle capacity or vehicle class.

10. The method of claim 1, wherein the ranking comprises:
    ranking the alternative destinations based on surge multipliers or matching probabilities of the alternative destinations.

11. The method of claim 1, wherein the receiving a trip request that comprises an origin and a destination comprises:
    receiving the trip request comprising an initial origin from the terminal device;
    determining one or more alternative origins based on the initial origin;
    displaying the one or more alternative origin to the terminal device for the rider to select; and
    determining one of the one or more alternative origins selected by the rider as the origin of the trip request.

12. A system comprising one or more processors and one or more non-transitory computer-readable memories coupled to the one or more processors, the one or more non-transitory computer-readable memories storing instructions that, when executed by the one or more processors, cause the system to perform operations comprising:
  receiving, by a computing device of a ridesharing platform from a terminal device, a trip request for a rider that comprises an origin and a destination;
  classifying, by the computing device of the ridesharing platform, the trip request into one of a plurality of trip purpose categories based at least on the origin and the destination of the trip request, the rider's information, and a classifier trained to predict the one trip purpose category of the trip;
  in response to the one trip purpose category belonging to a preset group of trip purpose categories:
    determining, by the computing device of the ridesharing platform based on the one trip purpose category, one or more alternative destinations for the trip request, wherein the one or more alternative destinations share one or more features with the destination of the trip request;
    ranking the one or more alternative destinations; and
    displaying, in addition to the destination from the trip request, the ranked one or more alternative destinations on the terminal device;
  wherein the preset group of trip purpose categories is determined by at least:
    identifying one or more historical trips in which alternative destinations were recommended and accepted by one or more historical users; and
    adding one or more trip purpose categories corresponding to the one or more historical trips into the preset group of trip purpose categories.

13. The system of claim 12, wherein the determining one or more alternative destinations for the trip request comprises:
  determining an estimated cost of the trip request, a service level of the trip request, and a business type of the destination of the trip request;
  identifying a plurality of point-of-interest (POI) locations of the business type within a range of the origin of the trip request;
  determining, for each of the POI locations, an estimated cost of a hypothetical trip with the service level from the origin to the POI location;
  determining one or more of the POI locations with corresponding estimated costs of the hypothetical trips that are not greater than the estimated cost of the trip request; and
  identifying the one or more alternative destinations for the trip request from the one or more determined POI locations.

14. The system of claim 12, the operations further comprise:
  identifying one or more historical trips in which alternative destinations were selected by a user; and
  adding one or more trip purpose categories corresponding to the one or more identified historical trips to the preset group of trip purpose categories.

15. The system of claim 12, wherein the classifier is trained based on training data comprising a plurality of historical trips labeled with a plurality of trip purpose categories, wherein for each of the plurality of historical trips, the training data comprises one or more of the following: trip information of the historical trip, rider information of the historical trip, point-of-interest information of the historical trip, and a label representing a trip purpose category of the historical trip.

16. A non-transitory computer-readable storage medium storing instructions that, when executed by one or more processors, cause the one or more processors to perform operations comprising:
  receiving, by a computing device of a ridesharing platform from a terminal device, a trip request for a rider that comprises an origin and a destination;
  classifying, by the computing device of the ridesharing platform, the trip request into one of a plurality of trip purpose categories based at least on the origin and the destination of the trip request, the rider's information, and a classifier trained to predict the one trip purpose category of the trip;
  in response to the one trip purpose category belonging to a preset group of trip purpose categories:
    determining, by the computing device of the ridesharing platform based on the one trip purpose category, one or more alternative destinations for the trip request, wherein the one or more alternative destinations share one or more features with the destination of the trip request;
    ranking the one or more alternative destinations; and
    displaying, in addition to the destination from the trip request, the ranked one or more alternative destinations on the terminal device;
  wherein the preset group of trip purpose categories is determined by at least:
    identifying one or more historical trips in which alternative destinations were recommended and accepted by one or more historical users; and
    adding one or more trip purpose categories corresponding to the one or more historical trips into the preset group of trip purpose categories.

17. The storage medium of claim 16, wherein the determining one or more alternative destinations for the trip request comprises:
  determining an estimated cost of the trip request, a service level of the trip request, and a business type of the destination of the trip request;
  identifying a plurality of point-of-interest (POI) locations of the business type within a range of the origin of the trip request;
  determining, for each of the POI locations, an estimated cost of a hypothetical trip with the service level from the origin to the POI location;
  determining one or more of the POI locations with corresponding estimated costs of the hypothetical trips that are not greater than the estimated cost of the trip request; and
  identifying the one or more alternative destinations for the trip request from the one or more determined POI locations.

18. The storage medium of claim 16, the operations further comprise:
  identifying one or more historical trips in which alternative destinations were selected by a user; and
  adding one or more trip purpose categories corresponding to the one or more identified historical trips to the preset group of trip purpose categories.

19. The storage medium of claim 16, wherein the classifier is trained based on training data comprising a plurality of historical trips labeled with a plurality of trip purpose categories, wherein for each of the plurality of historical trips, the training data comprises one or more of the following: trip information of the historical trip, rider information of the historical trip, point-of-interest information of the historical trip, and a label representing a trip purpose category of the historical trip.

* * * * *

UNITED STATES PATENT AND TRADEMARK OFFICE
CERTIFICATE OF CORRECTION

PATENT NO. : 11,719,548 B2
APPLICATION NO. : 17/035104
DATED : August 8, 2023
INVENTOR(S) : Liang Tang et al.

It is certified that error appears in the above-identified patent and that said Letters Patent is hereby corrected as shown below:

In the Claims

Claim 12, Column 21, Lines 11-12:
"the one trip purpose category of the trip;" should read -- the one trip purpose category of the trip request; --.

Claim 16, Column 22, Lines 13-14:
"the one trip purpose category of the trip;" should read -- the one trip purpose category of the trip request; --.

Signed and Sealed this
Twenty-third Day of April, 2024

Katherine Kelly Vidal
*Director of the United States Patent and Trademark Office*